No. 711,985.
E. LOHMANN.
LENS SYSTEM FOR PHOTOGRAPHIC PURPOSES.
(Application filed July 12, 1901.)
Patented Oct. 28, 1902.
(No Model.)
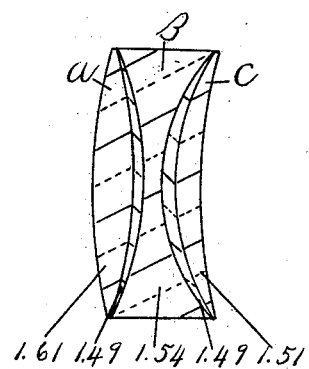
WITNESSES:
Osborn Wilson
Carl F. Wilson
INVENTOR
Edwin Lohmann

UNITED STATES PATENT OFFICE.

EDWIN LOHMANN, OF GREENVILLE, OHIO.

LENS SYSTEM FOR PHOTOGRAPHIC PURPOSES.

SPECIFICATION forming part of Letters Patent No. 711,985, dated October 28, 1902.

Application filed July 12, 1901. Serial No. 68,011. (No model.)

*To all whom it may concern:*

Be it known that I, EDWIN LOHMANN, a citizen of the United States, residing at Greenville, in the county of Darke and State of Ohio, have invented a new and useful Improvement in Lens Systems for Photographic Purposes, of which the following is a specification.

The object of the present invention is to obtain in photographic objectives complete control of the anastigmatic and spherical corrections not only for parallel rays, but also for rays of all angles however great, thereby securing a sharp and uniformly-corrected image throughout the field.

The drawing herewith is a longitudinal cross-section showing an objective embodying the present invention.

In existing photographic objectives composed of two systems of three or four single lenses each it has been found impossible at the desired speed of F 6 or 7 to secure a uniformly-perfect correction for angular as well as parallel rays, the image produced being not sharp throughout its extent, and if the screen upon which the image is projected be so placed as to show the central part of the picture sharp the edge of the field will be noticeably blurred, and vice versa. Being unable to remove this defect, it has only remained for opticians to palliate it and render it less objectionable by leaving a certain amount of uncorrected aberration, by means of which the diffusion is made to spread evenly over the field, sacrificing absolute sharpness for an evenly-corrected, though slightly-diffused, image. In existing objectives composed of three or four single lenses the point of refraction of a given ray of large angle for anastigmatic correction and the point of refraction of the same ray for spherical correction are at such unequal distances from the axis of the compound lens that an even balance of these corrections cannot be obtained. In accordance with this fact it has been shown that in doublets in which each lens is composed of three single lenses the most perfect field is secured by combining two objectives of like nature, but of dissimilar arrangement of the individual lenses, since by this arrangement the axial distances in the two lenses of the points of refraction for spherical and anastigmatic aberrations are reversed and a more equable correction secured. In order to secure this equalization in the greatest degree and retain the advantages of a symmetrical doublet, it is proposed in the present invention to employ a quintuple lens system composed of two positive meniscus lenses, each of which is inclosed between two of the remaining three lenses of the quintuple system. The anastigmatic and spherical corrections for rays of all angles will then be accomplished at points which are at the most equal distances from the axis possible. It is preferable for lenses intercepting a wide angle to have the inclosed positive meniscus lenses quite thin, as the correcting-surfaces for the two aberrations are then brought near together and the axial distances of the points of refraction are most equal.

The refractive indices indicated in the drawing are those preferred for this particular construction. It is to be understood, however, that the present invention does not depend upon the refractive indices shown, nor are these indices desirable for lenses of small angle. Considerable latitude may be used in selecting the indices for the middle and outer lenses, depending chiefly upon the thickness of the two inclosed positive meniscus lenses. In the accompanying figure the biconvex lens $a$ has the highest refractive power, (1.61.) The biconcave lens $b$ has the next highest refractive power, (1.54,) the positive meniscus lens $c$ having the next highest refractive power, (1.51,) while the two positive meniscus lenses separating $a$ from $b$ and $b$ from $c$ have the lowest refractive power, (1.49.) The two positive meniscus lenses inclosed between two of the remaining three lenses of the quintuple system may both be of the lowest refractive power; but this condition is not essential, as it is only necessary that each of these two positive meniscus lenses be of lower refractive power than either of the two lenses inclosing it.

Two of the herein-described quintuple systems may be employed to form a doublet for photographic purposes.

What I claim is—

A quintuple lens system composed of a biconvex lens of highest refractive power, a biconcave lens of next highest refractive power and an outer positive meniscus lens of lower refractive power than the biconcave lens, the outer biconvex and positive meniscus lenses being separated from the middle biconcave lens each by a positive meniscus lens of lower refractive power than either of the inclosing lenses, substantially as described.

EDWIN LOHMANN.

Witnesses:
OSBORN WILSON,
FRAZER C. WILSON.